G. D. POWELL.
PLANTER AND FERTILIZER DISTRIBUTER.
APPLICATION FILED JULY 24, 1919.
1,390,383.
Patented Sept. 13, 1921.
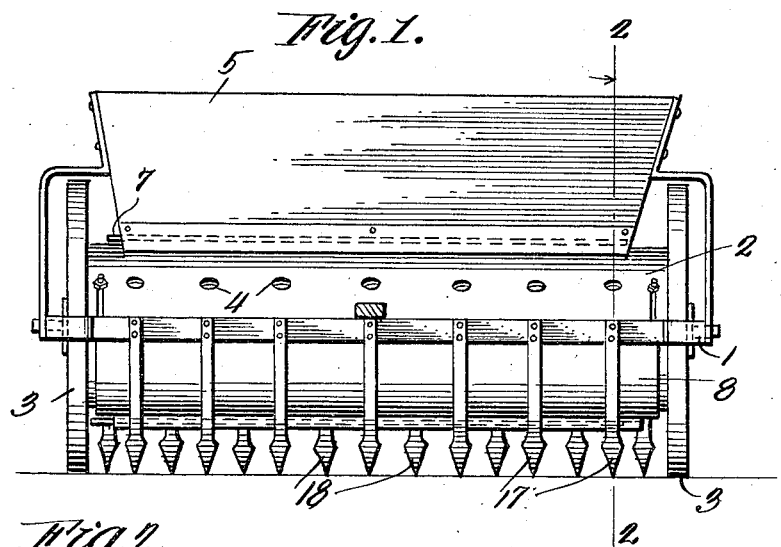
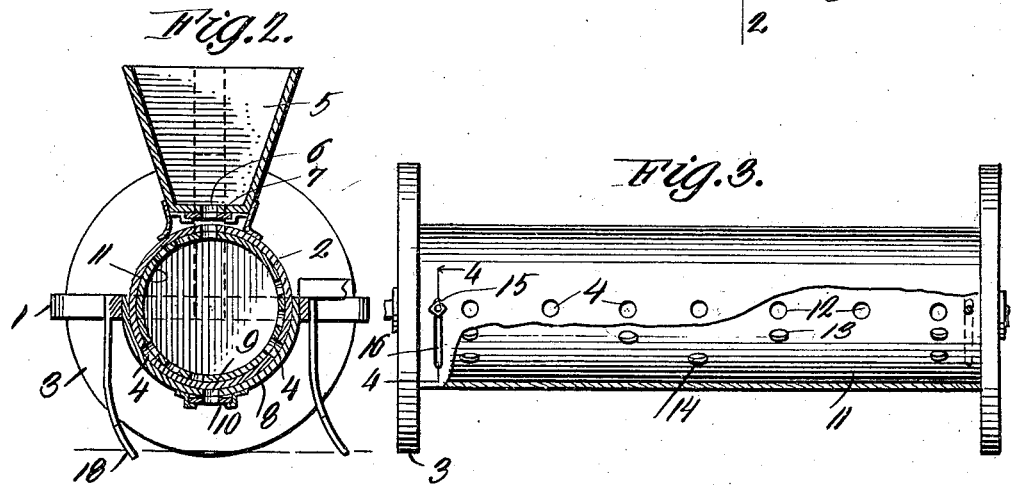
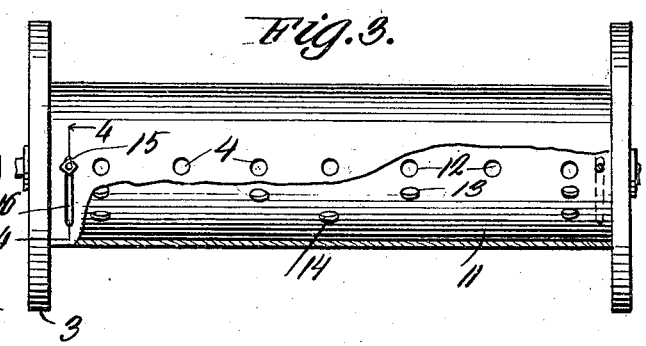
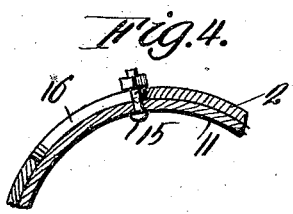
WITNESSES
Guy M. Spring
U. B. Hillyard.
Inventor
GEORGE D. POWELL
By Richard B. Owen
Attorney

UNITED STATES PATENT OFFICE.

GEORGE D. POWELL, OF McKENZIE, TENNESSEE.

PLANTER AND FERTILIZER-DISTRIBUTER.

1,390,383.

Specification of Letters Patent. Patented Sept. 13, 1921.

Application filed July 24, 1919. Serial No. 312,901.

*To all whom it may concern:*

Be it known that I, GEORGE D. POWELL, a citizen of the United States, residing at McKenzie, in the county of Carroll and State of Tennessee, have invented certain new and useful Improvements in Planters and Fertilizer-Distributers, of which the following is a specification.

The invention has relation to the type of agricultural implements designed chiefly for distributing seed and fertilizer in rows and at varying distances depending upon the hills, which is essential when planting corn which is required to be dropped in check rows, so as to obtain the best results in product.

The invention provides simple and effective means for varying the number of rows and the distance between the rows, whereby the machine may be adapted to the nature of the soil and the character of the seed to be distributed.

In accordance with the invention, the distributing mechanism consists of a drum, which is provided at its ends with rotary heads or wheels which are adapted to travel upon the ground, so as to impart a direct rotary movement to the drum. The rotary drum is provided in a side with one or more rows of openings, through which the seed or fertilizer passes into the drum from a hopper and is delivered from the drum into the furrows formed in the soil.

The invention furthermore provides a supplemental drum which may be disposed exterior to or within the distributing drum and which is provided with a set of openings consisting of a number of rows of openings, the different rows containing a varying number, so that the distributing drum may be adjusted for distributing seed or fertilizer in any given number of rows within the range of adjustment.

The invention furthermore contemplates means for regulating the supply of seed or fertilizer to the distributing drum and for controlling the discharge, said means consisting of a slide which is provided with openings corresponding in number and position with the openings in the distributing drum.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings hereto attached:

Figure 1 is a front view of a seeder and fertilizer distributer embodying the invention;

Fig. 2 is a sectional detail on the line 2—2 of Fig. 1;

Fig. 3 is a detail view of the distributing drum, a portion being broken away; and Fig. 4 is a sectional detail on the line 4—4 of Fig. 3, showing the parts on a large scale.

Corresponding and like parts are referred to in the following description and indicated in the several views of the drawings by like reference characters.

The machine embodies a suitable frame work 1 which supports the operating parts and to which the propelling power is applied. This frame work may be of any suitable construction. A distributing drum 2 is mounted on the frame work in any suitable way so as to rotate and is provided at its ends with circular heads 3 which constitute wheels for supporting the machine and imparting rotary movement to the drum. The drum is provided in its side with one or more rows of openings 4 through which the seed or fertilizer is adapted to pass into the drum and outward therefrom. A hopper 5 is located above the distributing drum and is adapted to receive the seed or fertilizer to be distributed. The hopper is provided in its bottom with openings 6 which register in position and number with the openings 4 of the drum. The effective size of the openings 6 may be regulated by means of a slide 7, which is mounted in suitable guides adjacent the bottom of the hopper. The slide 7 constitutes a cut-off and is provided with openings to register with the openings 6. Movement of the slide 7 will regulate the effective size of the openings 6 or entirely close said openings, thereby preventing any waste of material when the machine is not required for active service in the distributing of seeds or fertilizer.

A breast or curved plate 8 is located beneath the distributing drum and is provided in its lowest portion with openings 9 which register in position and number with the openings 4 so as to provide for a discharge of the seed or fertilizer. A slide or cut-off 10 is disposed beneath the breast 8 and is mounted in guides thereon. The slide 10 like the slide 7 has openings to register with the openings 4 of the distributing drum. Movement of the slide 10 will close the openings 9 or vary the effective size thereof so as to control the delivery of the material. It is to be understood that any suitable means may be provided for positively holding the slides 7 and 10 in the adjusted position.

It must be remembered that the distributing drum 2 may be provided with any desired number of rows of openings 4 and that each row may contain any number of openings which are equally spaced, so as to distribute the seed or fertilizer in rows. In order to provide for varying the number of rows of seed or fertilizer to be distributed, a regulating cylinder 11 is associated with the distributing drum 2 and is provided with groups of rows of openings 12, 13 and 14. The row 12 contains as many openings as there are openings 14 in a row of the distributing drum. The row 13 contains a less number of openings than the row 4. The row 14 contains still a less number of openings than the row 4. It is to be understood that the regulating cylinder may be provided with any number of rows of openings to a group and each row may contain a different number of openings. It is highly important that the openings of the rows of openings in the regulating cylinder register with certain openings 4 of the distributing drum. By properly adjusting the regulating cylinder, the machine may be adapted for distributing any required number of rows of seed or fertilizer within the range of adjustment. The relation of the regulating cylinder is unimportant within the scope of the invention and for convenience, the same is shown as disposed within the distributing drum and is held in the adjusted position by means of fastenings 15 operating in slots 16.

The machine is provided with opening shovels 17 and covering shovels 18, the opening shovels being disposed in advance of the distributing mechanism and the covering shovels located in the rear thereof. In practice the seed or fertilizer to be distributed is placed in the hopper 5 and as the machine is drawn over the field, the material passes from the hopper into the drum when the openings 4 register with the openings 6. When the openings 4 register with the openings 9, the material discharges from the distributing drum. The seed may be regulated by means of adjustment of one or both of the slides 7 and 10.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is :—

1. In a machine for distributing seed and fertilizer, concentric cylinders, one of the cylinders having a row of openings and the companion cylinder having rows of openings which are adapted to register with certain openings of the cylinder having the single row of openings, the several rows of the adjustable cylinder having a varying number of openings, whereby the mechanism may be adjusted to distribute the material in any given number of rows within the range of adjustment of the mechanism.

2. A machine for distributing fertilizer, seed and the like, comprising a rotary drum provided in a side with a row of openings and a regulating cylinder within the drum and provided with a plurality of rows of openings, each of which has a number of openings differing from the other rows and the openings of the several rows being adapted to register with openings of the distributing drum.

In testimony wherof I affix my signature in presence of two witnesses.

GEORGE D. POWELL.

Witnesses:
H. R. OWNLY,
J. W. PATE.